(12) United States Patent
Yoshikawa

(10) Patent No.: US 7,901,146 B2
(45) Date of Patent: Mar. 8, 2011

(54) OPTICAL MODULE, OPTICAL TRANSMISSION DEVICE, AND SURFACE OPTICAL DEVICE

(75) Inventor: Masahiro Yoshikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 114 days.

(21) Appl. No.: 12/357,741

(22) Filed: Jan. 22, 2009

(65) Prior Publication Data

US 2010/0074573 A1  Mar. 25, 2010

(30) Foreign Application Priority Data

Sep. 25, 2008  (JP) ................. 2008-245920

(51) Int. Cl.
*G02B 6/36* (2006.01)
*G02B 6/12* (2006.01)

(52) U.S. Cl. ............ 385/88; 385/14; 385/90; 385/91; 385/92

(58) Field of Classification Search .......... 385/88, 385/90–94
See application file for complete search history.

(56) References Cited

U.S. PATENT DOCUMENTS

| 6,058,234 | A  | * | 5/2000 | Tachigori ............... 385/49 |
| 6,227,723 | B1 | * | 5/2001 | Masuda et al. .......... 385/88 |
| 6,294,232 | B1 | * | 9/2001 | Yamauchi ............... 428/27 |
| 6,377,385 | B1 | * | 4/2002 | Saito ................... 359/248 |
| 6,454,468 | B1 | * | 9/2002 | Yoon et al. ............. 385/88 |
| 6,775,440 | B2 | * | 8/2004 | Kishida et al. .......... 385/49 |

FOREIGN PATENT DOCUMENTS

| EP | 0840154 | 5/1998 |
| EP | 0864893 | 9/1998 |
| JP | 09-325243 | 12/1997 |
| JP | 10-170769 | 6/1998 |
| JP | 2002-014258 | 1/2002 |
| JP | 2004-336025 | 11/2004 |
| WO | 02/42820 | 5/2002 |

* cited by examiner

*Primary Examiner* — Rhonda S Peace
(74) *Attorney, Agent, or Firm* — Fildes & Outland, P.C.

(57) ABSTRACT

An optical module includes a mounted member, a surface optical device and a positioning portion. The mounted member includes an inserted portion. The surface optical device includes a substrate, an optical axis, and an insertion portion. The optical axis is provided in a direction perpendicular to the substrate. The insertion portion has a step surface that is inserted into the inserted portion of the mounted member in a direction perpendicular to the optical axis so as to position the optical axis. The positioning portion is provided in the mounted member and positions an optical transmission member so that the optical transmission member is optically coupled to the surface optical device.

9 Claims, 13 Drawing Sheets

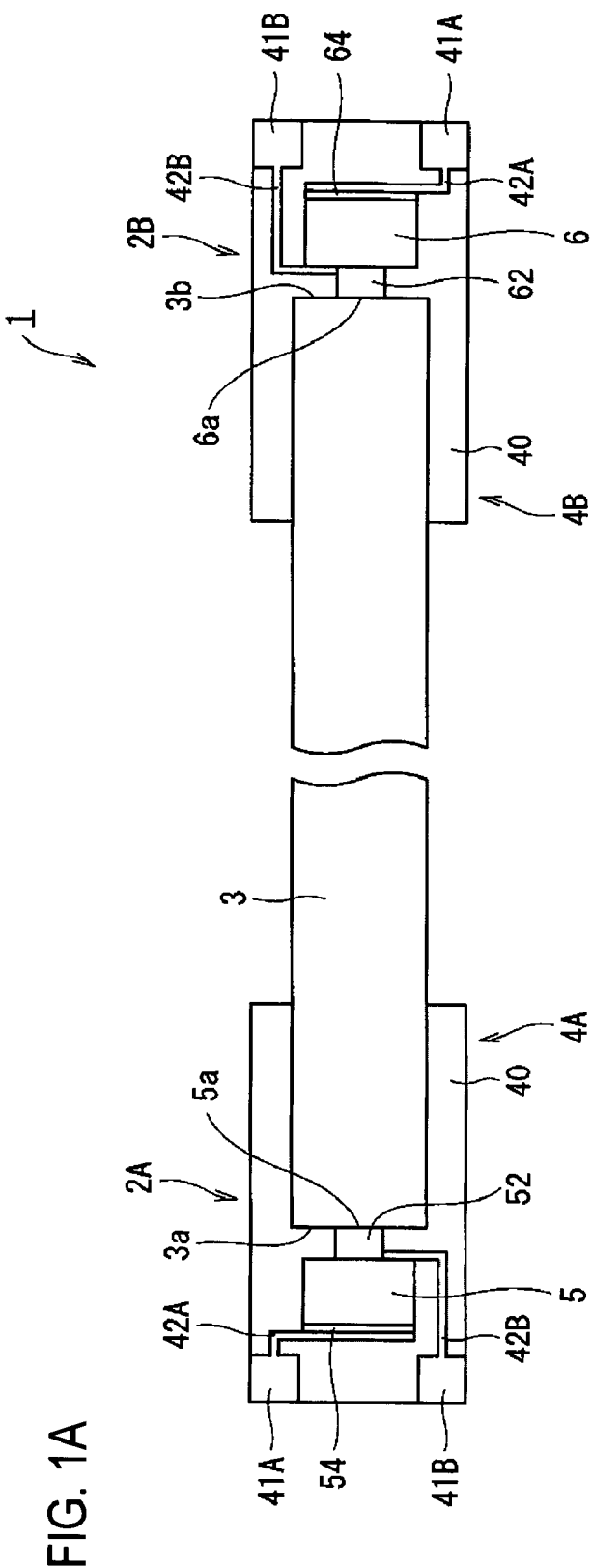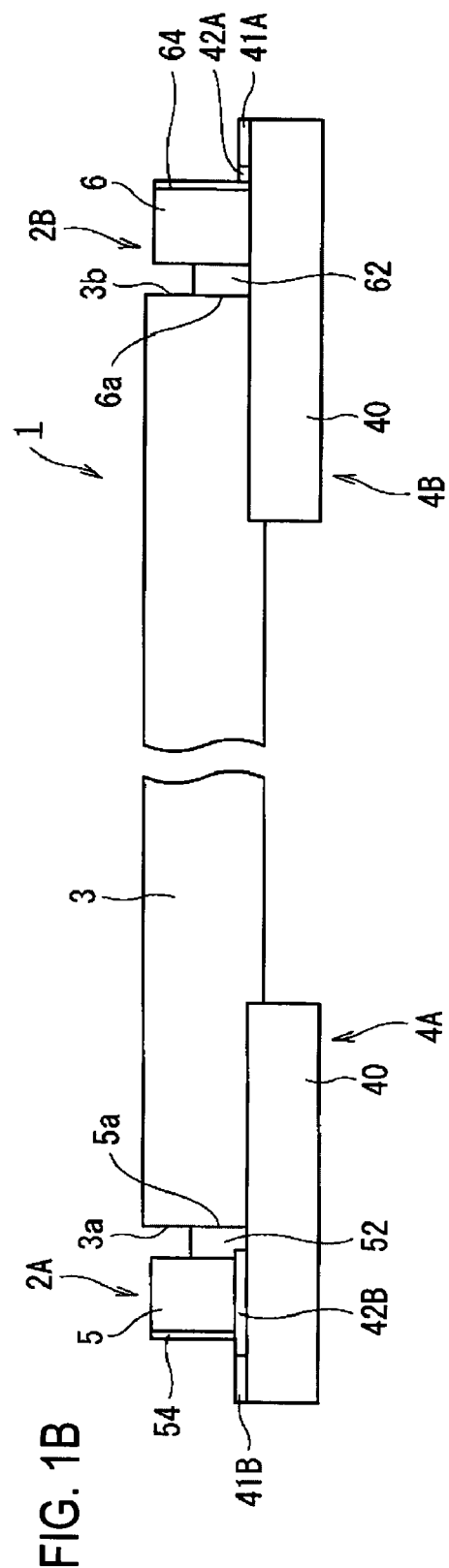

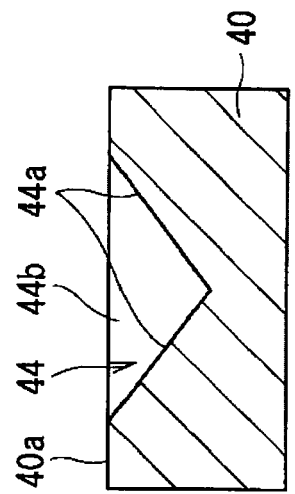
FIG. 4C
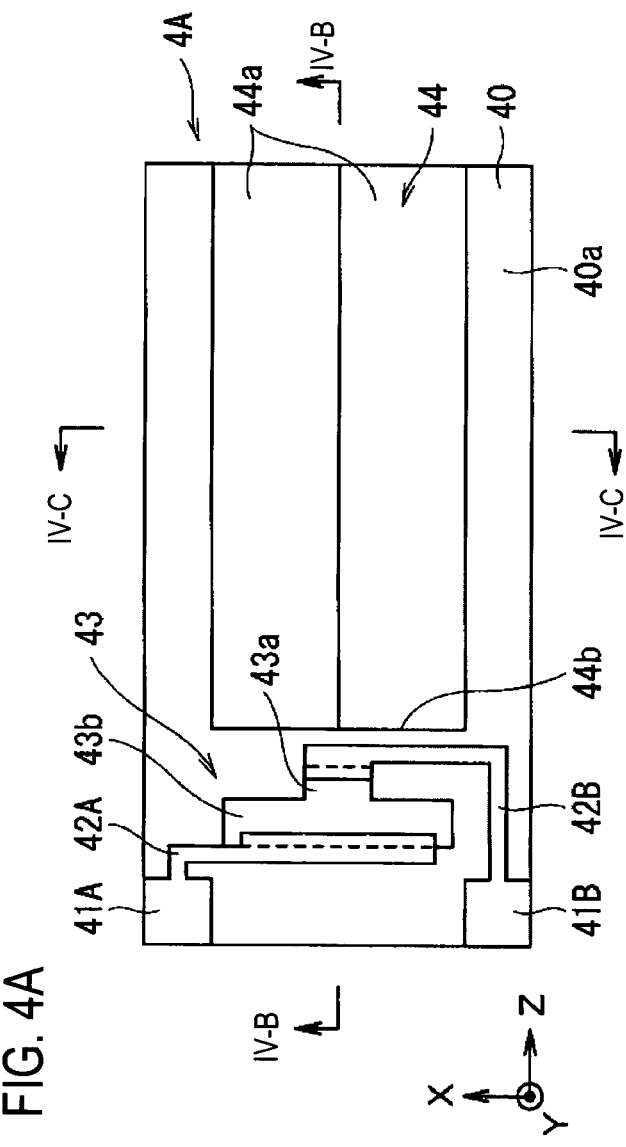
FIG. 4A
FIG. 4B

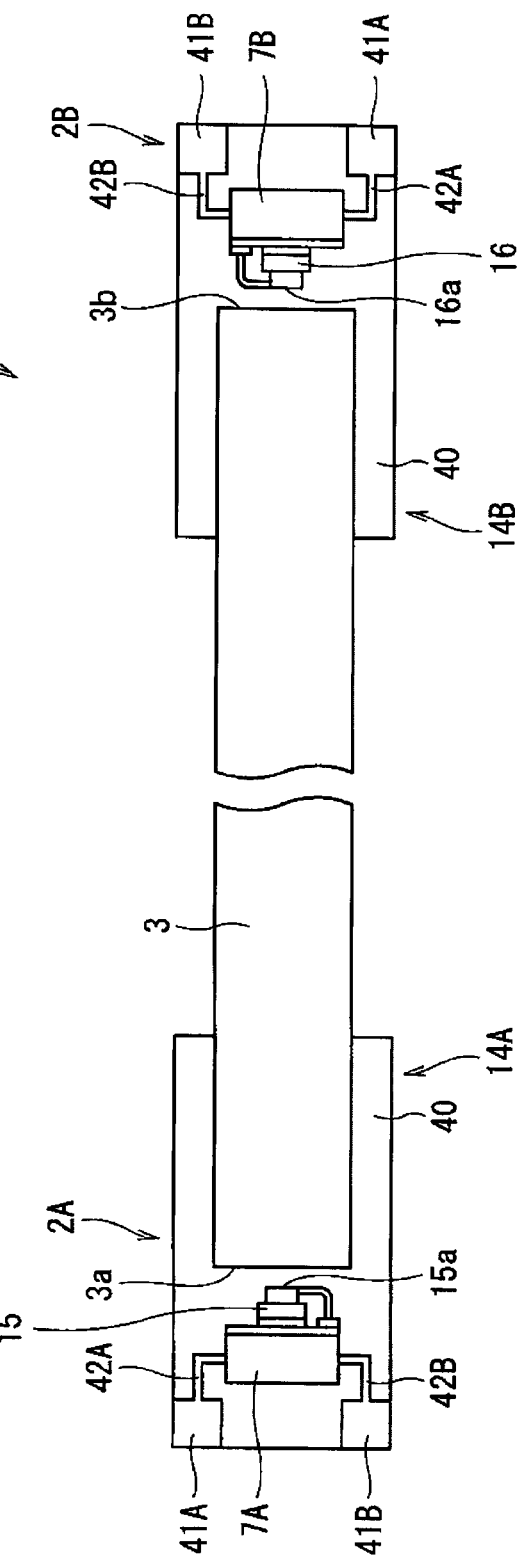
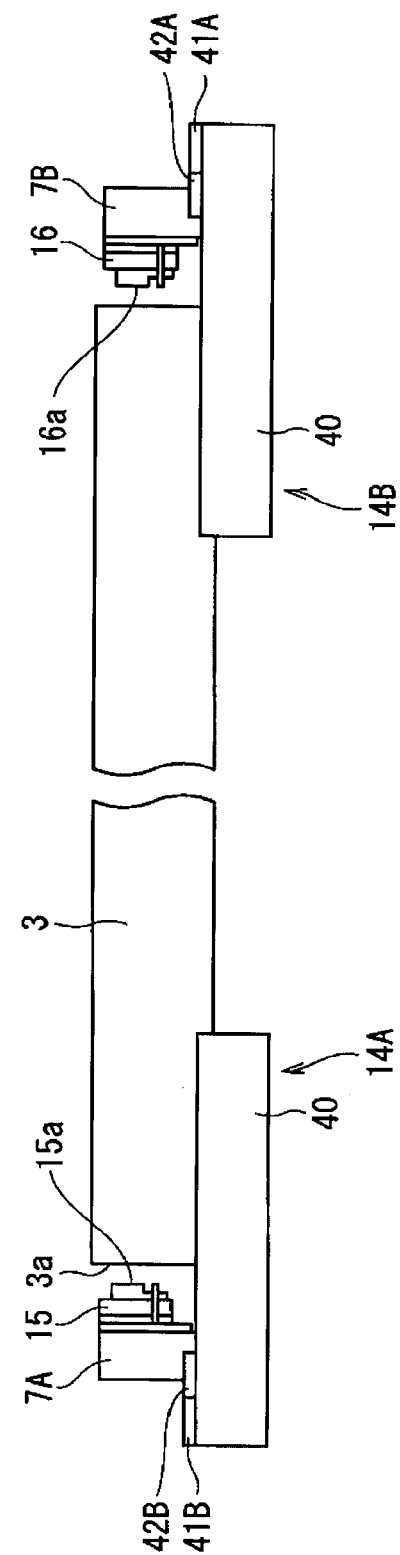

OPTICAL MODULE, OPTICAL TRANSMISSION DEVICE, AND SURFACE OPTICAL DEVICE

CROSS-REFERENCE TO RELATED APPLICATIONS

This application is based on and claims priority under 35 USC 119 from Japanese Patent Application No. 2008-245920 filed on Sep. 25, 2008.

BACKGROUND

Technical Field

The invention relates to an optical module, an optical transmission device, and a surface optical device.

SUMMARY

According to an aspect of the invention, an optical module includes a mounted member, a surface optical device and a positioning portion. The mounted member includes an inserted portion. The surface optical device includes a substrate, an optical axis and an insertion portion. The optical axis is provided in a direction perpendicular to the substrate. The insertion portion has a step surface that is inserted into the inserted portion of the mounted member in a direction perpendicular to the optical axis so as to position the optical axis. The positioning portion is provided in the mounted member and positions an optical transmission member so that the optical transmission member is optically coupled to the surface optical device.

BRIEF DESCRIPTION OF THE DRAWINGS

Exemplary embodiments of the invention will be described in detail based on the following figures, wherein:

FIGS. 1A and 1B show the schematic configuration of an optical transmission device according to a first exemplary embodiment of the invention; and FIG. 1A is a plan view and FIG. 1B is a front view;

FIG. 2A is a front view, FIG. 2B is a side view, and FIG. 2C is a bottom view;

FIGS. 3A, 3C, and 3E are front views, and FIGS. 3B and 3D are side views of FIGS. 3A and 3C, respectively;

FIGS. 4A to 4C show a support substrate for a surface light-emitting device according to the first exemplary embodiment; and FIG. 4A is a plan view, FIG. 4B is a sectional view taken along the line IVB-IVB of FIG. 4A, and FIG. 4C is a sectional view taken along the line IVC-IVC of FIG. 4A;

FIG. 5A is a front view, FIG. 5B is a side view, and FIG. 5C is a bottom view;

FIGS. 7A and 7B show the schematic configuration of an optical transmission device according to a second exemplary embodiment of the invention; and FIG. 7A is a plan view and FIG. 7B is a front view;

FIG. 8A is a front view and FIG. 8B is a side view;

FIG. 9A is a plan view, FIG. 9B is a side view, and FIG. 9C is a bottom view;

FIG. 10A is a front view and FIG. 10B is a bottom view;

FIG. 13A is a front view and FIG. 13B is a side view.

DETAILED DESCRIPTION

Figure 2A:
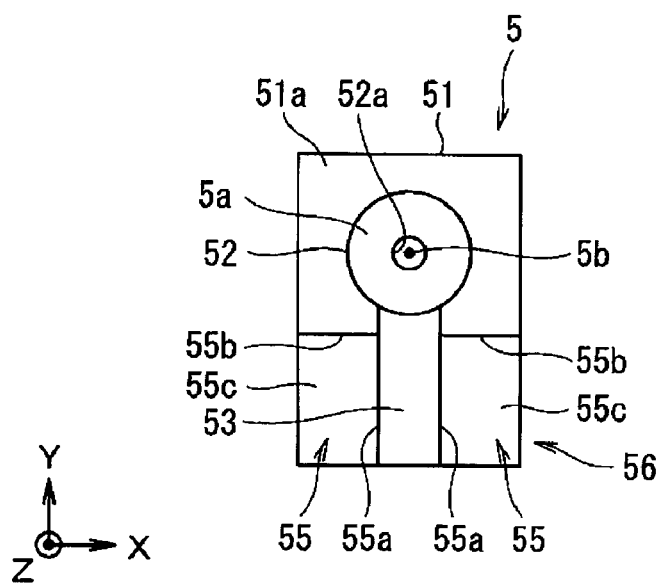
FIGS. 2A to 2C show a surface light-emitting device according to the first exemplary embodiment.

An optical transmission device includes first and second mounted members, a surface light-emitting device, a surface light-receiving device, an optical transmission member, a first positioning portion, and a second positioning portion. Each of the first and second mounted members includes an inserted portion. The surface light-emitting device includes a first substrate, a first optical axis and a first insertion portion. The first optical axis is provided in a direction perpendicular to the first substrate. The first insertion portion has a first step surface that is inserted into the inserted portion of the first mounted member in a direction perpendicular to the first optical axis so as to position the first optical axis. The surface light-receiving device includes a second substrate, a second optical axis and a second insertion portion. The second optical axis is provided in the direction perpendicular to the second substrate. The second insertion portion has a second step surface that is inserted into the inserted portion of the second mounted member in a direction perpendicular to the second optical axis so as to position the second optical axis. The optical transmission member optically couples the surface light-emitting device and the surface light-receiving device. The first positioning portion is provided in the first mounted member and positions one end of the optical transmission member so that the optical transmission member is optically coupled to the surface light-emitting device. The second positioning portion is provided in the second mounted member and positions the other end of the optical transmission member so that the optical transmission member is optically coupled to the surface light-receiving device.

The mounted member may be implemented by, for example, by a member made of a single material, a printed wiring board, and the like. The inserted portion may be implemented, for example, by a through groove (hole), a depressed groove (hole), or the like.

The optical transmission member may be implemented, for example, by an optical fiber in which a clad is formed in the vicinity of a core having a circular section, an optical waveguide in which a clad is formed in the vicinity of a core having a rectangular section, or a transparent medium having no clad therearound entirely or partially.

The positioning portion may be implemented, for example, by a V-shaped groove having a V-shaped section, a U-shaped groove having a U-shaped section, or the like. The positioning portion is not limited to a groove insofar as it can position two directions perpendicular to the optical axis of the optical transmission member. For example, an additional member for positioning the optical transmission member may be adhered to the mounted member by adhesion.

The insertion portions may be provided in the intermediate member in place of the surface light-emitting device and the surface light-receiving device, and the surface light-emitting device and the surface light-receiving device may be mounted on the intermediate member. The intermediate member may be made of resin, a metal, or the like.

First Exemplary Embodiment

FIGS. 1A and 1B show the schematic configuration of an optical transmission device according to a first exemplary embodiment of the invention. FIG. 1A is a plan view, and FIG. 1B is a front view.

An optical transmission device 1 includes a light emitting module 2A that outputs an optical signal, an optical fiber (optical transmission member) 3 that transmits the optical signal output from the light emitting module 2A, and a light receiving module 2B that receives the optical signal transmitted by the optical fiber 3.

The light emitting module 2A includes a support substrate (an example of a mounted member) 4A and a surface light-emitting device (an example of a surface optical device) 5 that is inserted into the support substrate 4A and is mounted on the support substrate 4A. A light emitting surface (optical surface) 5a of the surface light-emitting device 5 and an input surface 3a of the optical fiber 3 may come into contact with each other directly or through a gap. The gap may be buried with an optical adhesive. A lens may be formed on at least one of the input surface 3a of the optical fiber 3 and the light emitting surface 5a of the surface light-emitting device 5.

The light receiving module 2B includes a support substrate (an example of the mounted member) 4B, and a surface light-receiving device (an example of the surface optical device) 6 that is inserted into the support substrate 4B and is mounted on the support substrate 4B. A light receiving surface (optical surface) 6a of the surface light-receiving device 6 and an output surface 3b of the optical fiber 3 may come into contact with each other directly or through a gap. The gap may be buried with an optical adhesive. A lens may be formed on at least one of the output surface 3b of the optical fiber 3 and the light receiving surface 6a of the surface light-receiving device 6.

The optical fiber 3 has a core having a circular section, and a clad that is formed in the vicinity of the core. The optical fiber 3 may be a multi-mode optical fiber that transmits light in multiple modes (paths) or a single-mode optical fiber that transmits light in a single mode. In this exemplary embodiment, a multi-mode optical fiber having a core diameter of 50 μm and an outer diameter of 125 μm is used.

(Surface Light-Emitting Device)

Figure 2B:
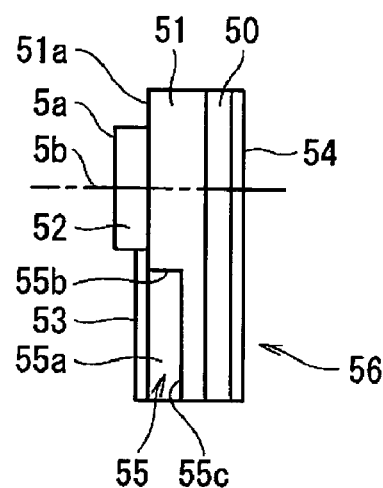
Figure 2C:
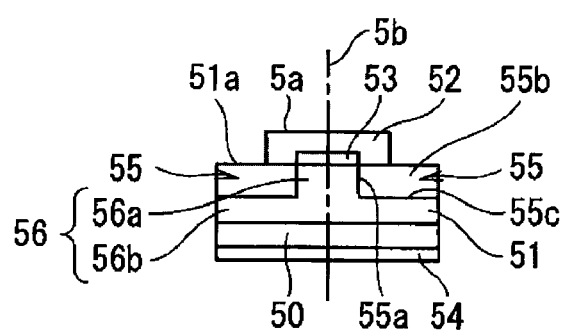

FIGS. 2A to 2C show the surface light-emitting device 5. FIG. 2A is a front view, FIG. 2B is a side view, and FIG. 2C is a bottom view. The surface light-emitting device 5 may be a surface light emitting diode or a surface light emitting laser. In this exemplary embodiment, a surface light emitting laser is used. As shown in FIG. 2, the surface light-emitting device 5, which is the surface light emitting laser, includes, for example: an n-type GaAs substrate 50; a compound semiconductor laminate structure 51 that is formed on the n-type GaAs substrate 50 and has an n-type lower reflecting mirror layer, an active layer, a current-confined layer, a p-type upper reflecting mirror layer, a p-type contact layer and the like; a circular mesa that is formed on the compound semiconductor laminate structure 51; a p-side electrode 52 that is formed on a surface of the mesa; a lead electrode 53 that is connected to the p-side electrode 52; and an n-side electrode 54 that is formed on a rear surface of the n-type GaAs substrate 50.

The p-side electrode 52, the lead electrode 53, and the n-side electrode 54 are made of, for example, a conductive material such as gold, copper, or the like.

The surface light-emitting device 5 has an optical axis 5b in a direction perpendicular to the n-type GaAs substrate 50. The p-side electrode 52 has a circular opening 52a around the optical axis 5b above a light emitting region of the active layer.

In a lower side of FIG. 2A, the surface light-emitting device 5 has an insertion portion 56 that is inserted into a dent (which will be described later) of the support substrate 4A. The insertion portion 56 has a convex portion 56a and a base portion 56b. A pair of grooves 55 are formed on both sides of the lead electrode 53 of a surface 51a of the compound semiconductor laminate structure 51, thereby forming the convex portion 56a and the base portion 56b. Each of the grooves 55 has a vertical wall surface 55a that positions an X direction of the optical axis 5b, a horizontal wall surface 55b that positions a Y direction of the optical axis 5b, and a bottom surface 55c that positions a Z direction (optical axis direction) of the light emitting surface 5a. The vertical wall surface 55a, the horizontal wall surface 55b, and the bottom surface 55c form a step surface.

Figure 3A:
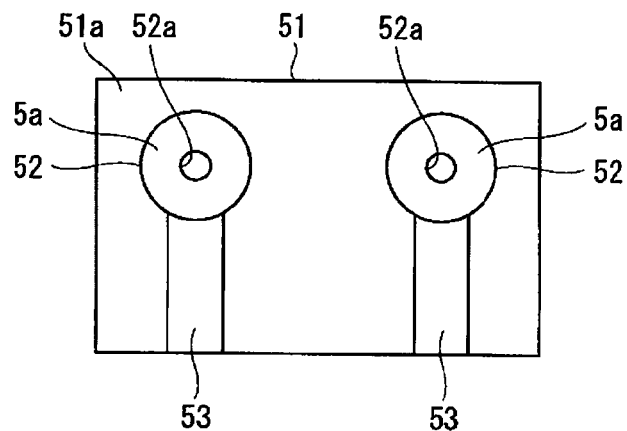
FIGS. 3A to 3E show a manufacturing process of the surface light-emitting device according to the first exemplary embodiment.
Figure 3B:
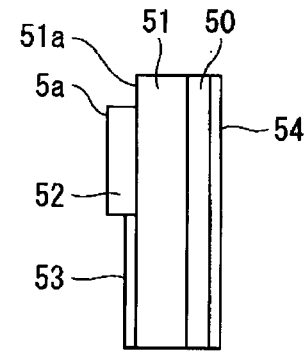
Figure 3C:
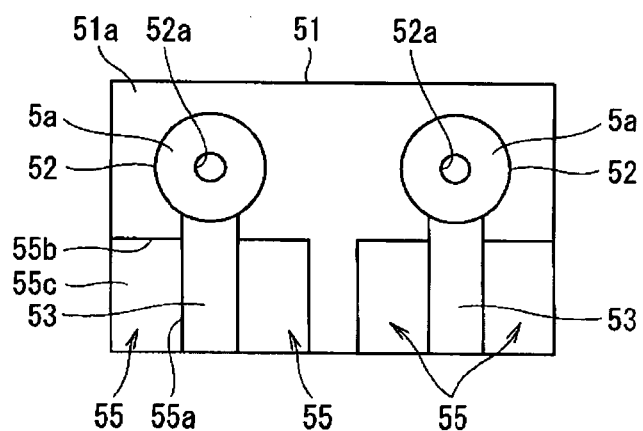
Figure 3D:
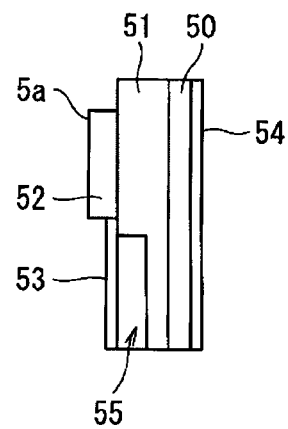
Figure 3E:
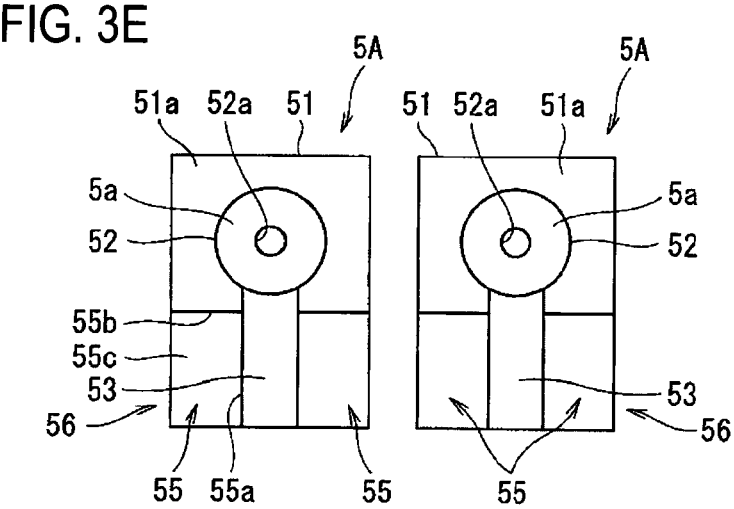

FIGS. 3A to 3E show an example of a manufacturing process of the surface light-emitting device 5. FIGS. 3A, 3C, and 3E are front views, and FIGS. 3B and 3D are side views of FIGS. 3A and 3C, respectively. Next, an example of a manufacturing method of the surface light-emitting device 5 will be described with reference to FIGS. 3A to 3E.

As shown in FIGS. 3A and 3B, the compound semiconductor laminate structure 51, which has the n-type lower reflecting mirror layer, the active layer, the current-confined layer, the p-type upper reflecting mirror layer, the p-type contact layer, and the like, the mesa, the p-side electrode 52, and the lead electrode 53 are formed, for each light emitting device, on the n-type GaAs substrate 50. The n-side electrode 54 is formed on the rear surface of the n-type GaAs substrate 50.

Next, as shown in FIGS. 3C and 3D, a pair of grooves 55 are formed, for each light emitting device, on both sides of the lead electrode 53 of the surface 51a of the compound semiconductor laminate structure 51.

Next, as shown in FIG. 3E, two light emitting devices are separated from each other by a dicer. Thereby, two surface light-emitting devices 5 are manufactured.

With reference to FIGS. 3A to 3E, the case in which two light emitting devices are collectively manufactured has been described. However, the number of light emitting devices that are collectively manufactured is not limited to two. For example, three or more light emitting devices may be collectively manufactured. The grooves 55 may be formed at the same time when the mesa is formed. In this exemplary embodiment, an example where the grooves 55 are stopped in the middle of the compound semiconductor laminate structure 51 has been described. However, the grooves 55 may be formed so as to reach the n-type GaAs substrate 50.

(Support Substrate for Surface Light-Emitting Device)

FIGS. 4A to 4C show the support substrate for the surface light-emitting device. FIG. 4A is a plan view, FIG. 4B is a sectional view taken along the line IVB-IVB of FIG. 4A, and FIG. 4C is a sectional view taken along the line IVC-IVC of FIG. 4A.

The support substrate 4A for a surface light-emitting device has a base member 40 made of an insulating material such as silicon, glass epoxy resin, or the like, and a pair of electrode pads 41A and 41B and a pair of lead wires 42A and 42B that are formed on a top surface 40a of the base member 40.

The base member 40 substantially has a rectangular shape, and is provided with a dent (an example of an inserted portion) 43 for positioning the surface light-emitting device 5 and a V-shaped groove (an example of a positioning portion) 44 for positioning the optical fiber 3 in the top surface 40a.

The electrode pads 41A and 41B and the lead wires 42A and 42B are made of a conductive material such as gold, copper, or the like.

The dent 43 has a first dent portion 43a into which the convex portion 56a of the insertion portion 56 in the surface light-emitting device 5 is inserted, and a second dent portion 43b into which the base portion 56b of the insertion portion 56 is inserted. If the width of the convex portion 56a and the width of the first dent portion 43a are formed with high accuracy with respect to the optical axis 5b, misalignment in the X direction and the Y direction of the optical axis 5b of the surface light-emitting device 5 with respect to the support substrate 4A can be suppressed so as to be not more than several μm, and in particular, 1 μm.

The V-shaped groove 44 has a pair of inclined surfaces 44a and a vertical surface 44b. The V-shaped groove 44 may be formed, for example, by anisotropic etching, laser processing, or the like. The X direction and Y direction of the optical axis on the input surface 3a side of the optical fiber 3 are positioned by the pair of inclined surfaces 44a. The input surface 3a of the optical fiber 3 comes into contact with the vertical surface 44b, and thus the Z direction of the optical axis on the input surface 3a side of the optical fiber 3 is positioned.

(Surface Light-Receiving Device)

Figure 5A:
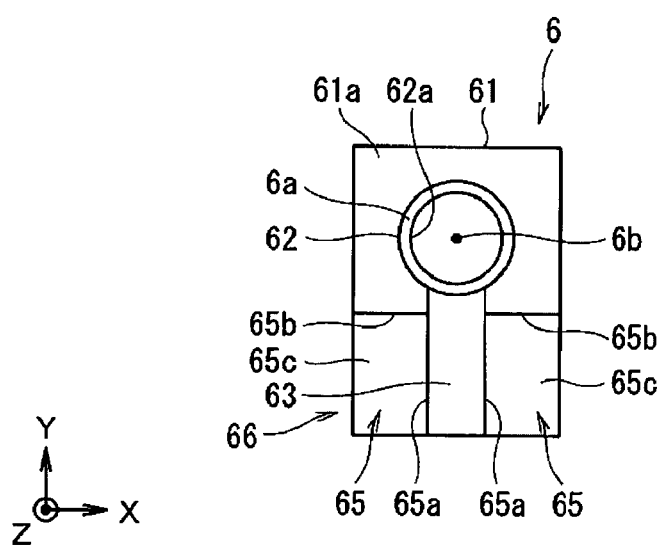
FIGS. 5A to 5C show a surface light-receiving device according to the first exemplary embodiment.
Figure 5B:
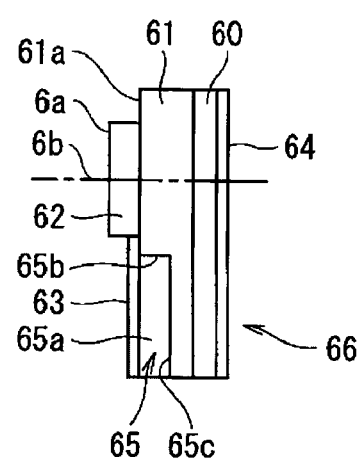
Figure 5C:
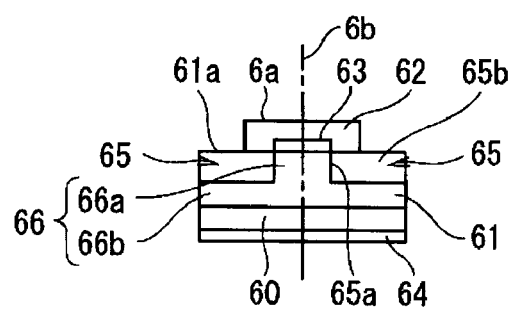

FIGS. 5A to 5C show the surface light-receiving device. FIG. 5A is a front view, FIG. 5B is a side view, and FIG. 5C is a bottom view. The surface light-receiving device 6 may be, for example, by a planar-type photodiode or the like. In this exemplary embodiment, a GaAs-based PIN photodiode having excellent high-speed response is used as the surface light-receiving device 6. The surface light-receiving device 6 includes, for example: an n-type GaAs substrate 60; a compound semiconductor laminate structure 61 that is formed on the n-type GaAs substrate 60 and has a P layer, an I layer, and an N layer, which are PIN coupled to each other; a circular mesa that is formed on the compound semiconductor laminate structure 61; a p-side electrode 62 that is formed on a surface of the mesa; a lead electrode 63 that is connected to the p-side electrode 62; and an n-side electrode 64 that is formed on a rear surface of the n-type GaAs substrate 60.

The surface light-receiving device 6 has an optical axis 6b perpendicular to the n-type GaAs substrate 60. The p-side electrode 62 has an opening 62a that is provided around the optical axis 6b and on which light is incident.

In a lower side of FIG. 5A, the surface light-receiving device 6 has an insertion portion 66 that is inserted into a dent of a support substrate 4B. The insertion portion 66 has a convex portion 66a and a base portion 66b. A pair of grooves 65 are formed on both sides of the lead electrode 63 of a surface 61a of the compound semiconductor laminate structure 61, thereby forming the convex portion 66a and the base portion 66b. Each of the grooves 65 has a vertical wall surface 65a for positioning an X direction of the optical axis 6b, a horizontal wall surface 65b for positioning a Y direction of the optical axis 6b, and a bottom surface 65c for positioning a Z direction (optical axis direction) of the light receiving surface 6a. The vertical wall surface 65a, the horizontal wall surface 65b, and the bottom surface 65c form the step surface.

The surface light-receiving device 6 may be manufactured in a similar manner as the surface light-emitting device 5. That is, the compound semiconductor laminate structure 61 having the P layer, the I layer, and the N layer, which are PIN coupled to each other, the p-side electrode 62, and the lead electrode 63 are formed, for each light receiving device, on the n-type GaAs substrate 60. The n-side electrode 64 is formed on the rear surface of the n-type GaAs substrate 60. Next, the pair of grooves 65 are formed, for each light receiving device, on both sides of the lead electrode 63 of the surface 61a of the compound semiconductor laminate structure 61. Next, plural light receiving devices are separated from each other by a dicer. Thus, the plural surface light-receiving devices 6 are manufactured.

In this exemplary embodiment, the example where the grooves 65 are stopped in the middle of the compound semiconductor laminate structure 61 has been described. However, the grooves 65 may be formed so as to reach the n-type GaAs substrate 60.

(Support Substrate for Surface Light-Receiving Device)

The support substrate 4B for a surface light-receiving device has the similar configuration to the support substrate 4A for a surface light-emitting device, and thus a detailed illustration thereof will be omitted. The support substrate 4B for a surface light-receiving device has a base member 40 that is made of an insulating material such as silicon, glass epoxy resin, or the like, and a pair of electrode pads 41A and 41B and a pair of lead wires 42A and 42B that are formed on a top surface of the base member 40.

The base member 40 substantially has a rectangular shape, and is provided with a dent (an example of the inserted portion) into which the surface light-receiving device 6 is inserted, and a V-shaped groove (an example of the positioning portion) for positioning the optical fiber 3 in the top surface 40a. The dent has a first dent portion into which the convex portion 66a of the insertion portion 66 in the surface light-receiving device 6 is inserted, and a second dent portion into which the base portion 66b of the insertion portion 66 is inserted. If the width of the convex portion 66a and the width of the first dent portion are formed with high accuracy, misalignment in the X direction and the Y direction of the surface light-receiving device 6 with respect to the support substrate 4B can be suppressed so as to be not more than several μm, and in particular, 1 μm.

(Assembling Method of Optical Transmission Device)

Figure 6:
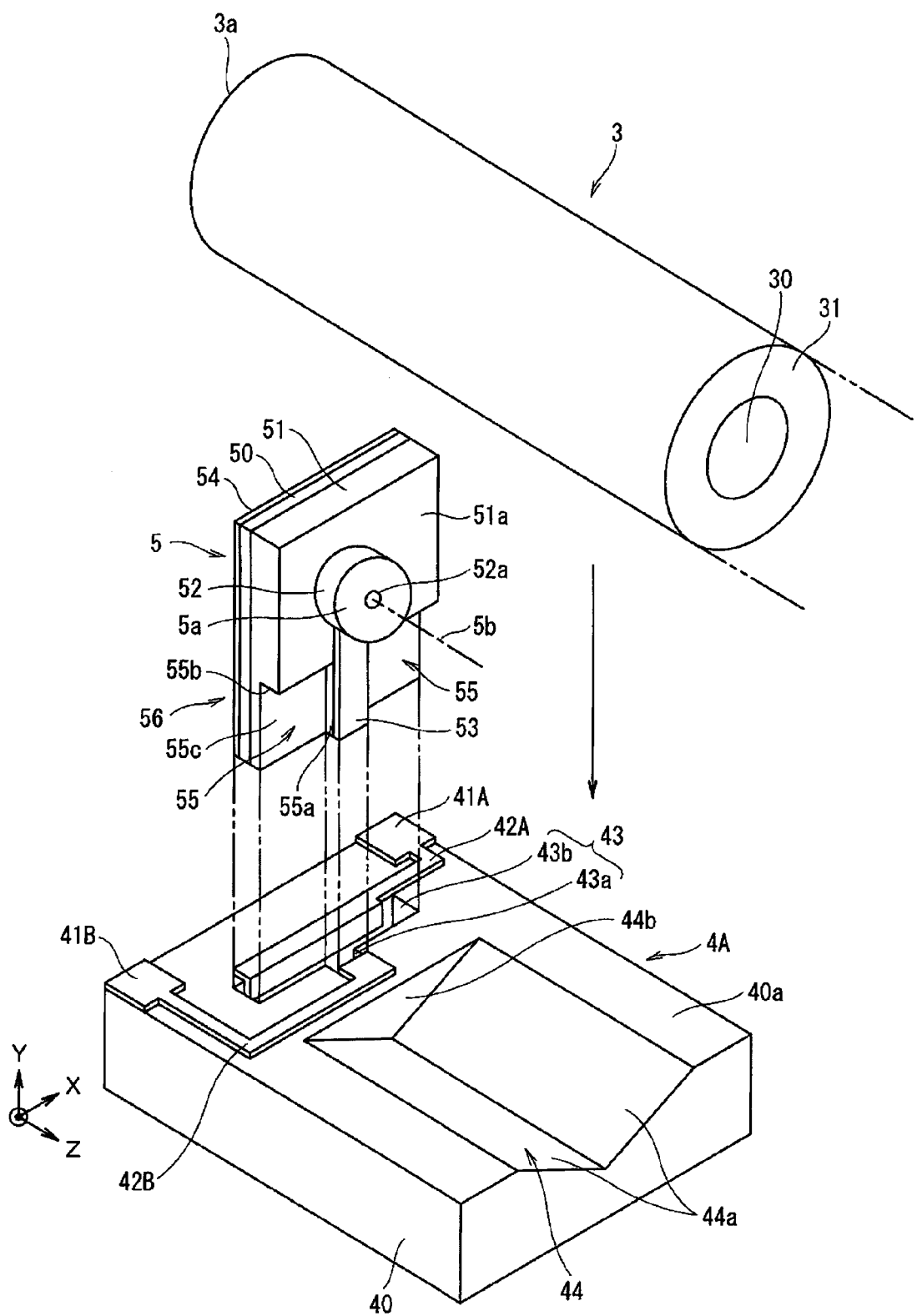
FIG. 6 is a perspective view showing an example of an assembling method of a light emitting module in an optical transmission device according to the first exemplary embodiment.

FIG. 6 is a perspective view showing an example of an assembling method of the optical transmission device on the light-emitting module 2A side. The example of the assembling method of the optical transmission device 1 will be described with reference to FIG. 6. In FIG. 6, reference numeral 30 denotes a core, and reference numeral 31 denotes a clad.

At first, the support substrates 4A and 4B, the surface light-emitting device 5, the surface light-receiving device 6, and the optical fiber 3, which is cut by a necessary length, are prepared. Next, the support substrates 4A and 4B are disposed at predetermined positions, for example, on a printed wiring board.

Next, as shown in FIG. 6, the insertion portion 56 of the surface light-emitting device 5 is inserted into the dent 43 of the support substrate 4A. Thereby, the lead electrode 53 of the surface light-emitting device 5 comes into contact with the lead wire 42B, and the n-side electrode 54 comes into contact with the lead wire 42A. The lead electrode 53 and the lead wire 42B, and the n-side electrode 54 and the lead wire 42A are slightly pressed and crushed, and put in a conduction state. In this case, the lead electrode 53 and the lead wire 42B, and the n-side electrode 54 and the lead wire 42A may be bonded to each other by using a conductive adhesive.

Similarly to the surface light-emitting device 5, with regard to the surface light-receiving device 6, the insertion portion 66 of the surface light-receiving device 6 is inserted into the dent of the support substrate 4B. Accordingly, the lead electrode 63 of the surface light-receiving device 6 comes into contact with the lead wire 42B, and the n-side electrode 64 comes into contact with the lead wire 42A. The lead electrode 63 and the lead wire 42B, and the n-side electrode 64 and the lead wire 42A are slightly pressed and crushed, and put in a conduction state. In this case, the lead electrode 63 and the lead wire 42B, and the n-side electrode 64 and the lead wire 42A may be bonded to each other by using a conductive adhesive.

Next, the optical fiber 3 is disposed on the V-shaped grooves 44 of the support substrates 4A and 4B, and the optical fiber 3 is fixed to the support substrates 4A and 4B by an adhesive or the like. Subsequently, the electrode pads 41A and 41B of the support substrates 4A and 4B are individually connected to pads on the printed wiring board by bonding wires, and the optical transmission device is mounted on the printed wiring board.

In this exemplary embodiment, a method that first mounts the support substrates 4A and 4B on the printed board has been described. Alternatively, the surface light-emitting device 5, the surface light-receiving device 6, and the optical fiber 3 may be first mounted on the support substrates 4A and 4B, and subsequently the support substrates 4A and 4B may be disposed at predetermined positions of the printer wiring board.

(Operation of Optical Transmission Device)

If a voltage is applied between the p-side electrode 52 and the n-side electrode 54 of the surface light-emitting device 5 in the light emitting module 2A, an optical signal that is laser light having a waveform of 850 nm is output from the light emitting region of the light emitting layer. The optical signal passes through the opening 52a of the p-side electrode 52, is incident on the input surface 3a of the optical fiber 3, propagates through the core 30 of the optical fiber 3, and is emitted from the output surface 3b. The optical signal emitted from the output surface 3b of the optical fiber 3 is incident on the opening 62a of the p-side electrode 62, which serves as a light receiving portion of the surface light-receiving device 6 in the light receiving module 2B. A current corresponding to a light intensity of the optical signal being incident on the light receiving portion flows between the p-side electrode 62 and the n-side electrode 64, and the optical signal is transmitted from the light emitting module 2A to the light receiving module 2B through the optical fiber 3.

Second Exemplary Embodiment

FIGS. 7A and 7B show the schematic configuration of an optical transmission device according to a second exemplary embodiment of the invention. FIG. 7A is a plan view, and FIG. 7B is a front view.

In this exemplary embodiment, a surface light-emitting device and a surface light-receiving device are attached to a support substrate through an intermediate member. Other parts are similar to those in the first exemplary embodiment.

The optical transmission device 1 has a light emitting module 2A that outputs an optical signal, an optical fiber (an example of the optical transmission member) 3 that serves as a light transmission path for transmitting the optical signal output from the light emitting module 2A, and a light receiving module 2B that receives the optical signal transmitted by the optical fiber 3.

The light emitting module 2A includes a support substrate (an example of the mounted member) 14A, a submount (an example of the intermediate member) 7A that is inserted into the support substrate 14A and attached to the support substrate 14A, and a surface light-emitting device (an example of the surface optical device) 15 that is mounted on the submount 7A. A light emitting surface (optical surface) 15a of the surface light-emitting device 15 and an input surface 3a of the optical fiber 3 may come into contact with each other directly or through a gap. The gap may be buried with an optical adhesive. A lens may be formed on at least one of the input surface 3a of the optical fiber 3 and the light emitting surface 15a of the surface light-emitting device 15.

The light receiving module 2B includes a support substrate (an example of the mounted member) 14B, a submount (an example of the intermediate member) 7B that is inserted into the support substrate 14B and attached to the support substrate 14B, and a surface light-receiving device 16 that is mounted on the submount 7B. A light receiving surface (optical surface) 16a of the surface light-receiving device 16 and an output surface 3b of the optical fiber 3 may come into contact with each other directly or through a gap. The gap may be buried with an optical adhesive. A lens may be formed on at least one of the output surface 3b of the optical fiber 3 and the light receiving surface 16a of the surface light-receiving device 16.

(Surface Light-Emitting Device)

Figure 8A:
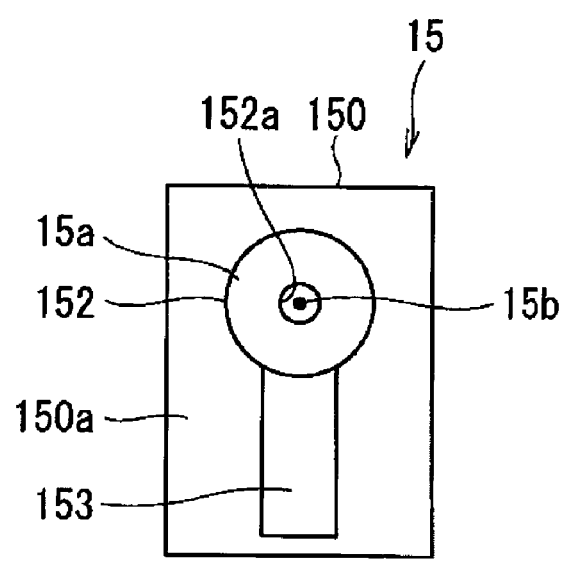
FIGS. 8A and 8B show a surface light-emitting device according to the second exemplary embodiment.
Figure 8B:
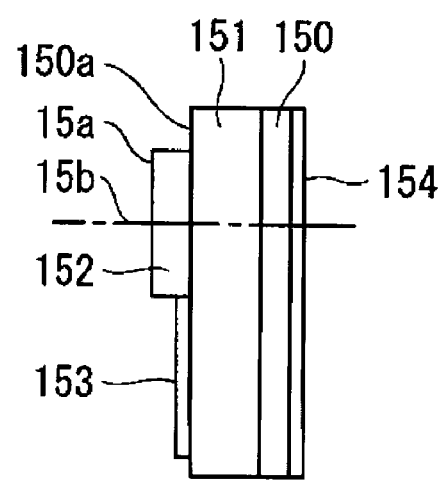

FIGS. 8A and 8B show the surface light-emitting device according to the second exemplary embodiment. FIG. 8A is a front view, and FIG. 8B is a side view. The surface light-emitting device 15 includes: an n-type GaAs substrate 150; a compound semiconductor laminate structure 151 that is formed on the n-type GaAs substrate 150 and has an n-type lower reflecting mirror layer, an active layer, a current-confined layer, a p-type upper reflecting mirror layer, a p-type contact layer, and the like; a circular mesa that is formed on the compound semiconductor laminate structure 151; a p-side electrode 152 that is formed on a surface of the mesa; a lead electrode 153 that is connected to the p-side electrode 152; and an n-side electrode 154 that is formed on a rear surface of the n-type GaAs substrate 150.

The p-side electrode 152, the lead electrode 153, and the n-side electrode 154 are made of a conductive material such as gold, copper, or the like.

The surface light-emitting device 15 has an optical axis 15b in a direction perpendicular to the n-type GaAs substrate 150. The p-side electrode 152 has an opening 152a around the optical axis 15b above a light emitting region of the active layer.

(Submount for Surface Light-Emitting Device)

Figure 9A:
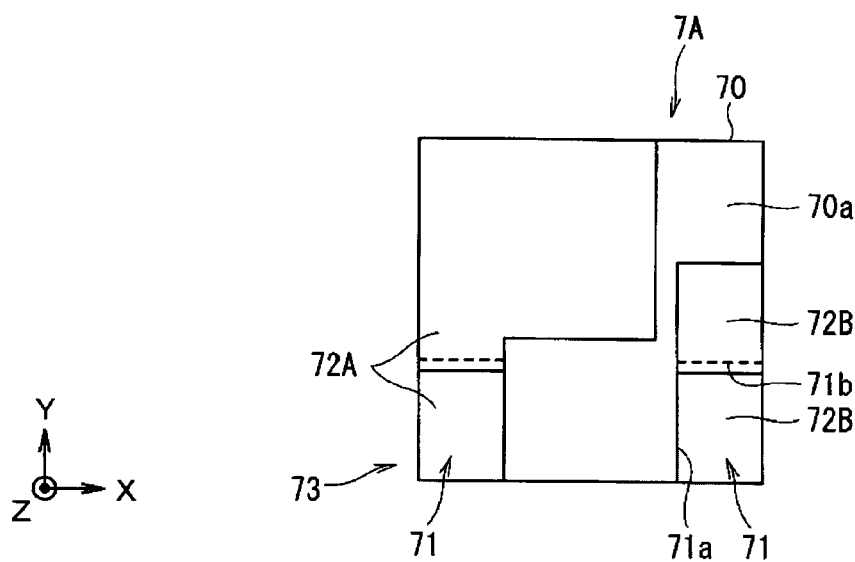
FIGS. 9A to 9C show a submount for a surface light-emitting device.
Figure 9B:
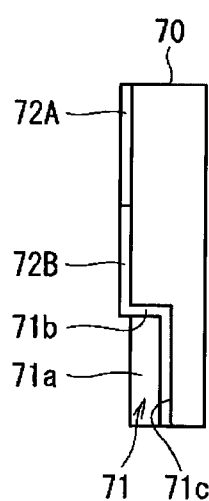
Figure 9C:
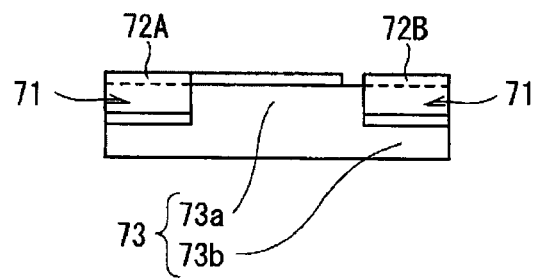

FIGS. 9A to 9C show the submount 7A for a surface light-emitting device. FIG. 9A is a plan view, FIG. 9B is a side view, and FIG. 9C is a bottom view. The submount 7A for a surface light-emitting device substantially has a rectangular shape, and is provided with a submount substrate 70 that is made of an insulating material such as silicon or the like, and an insertion portion 73 that is inserted into a dent (which will be described later) of the support substrate 14A in a lower portion of the surface of the submount substrate 70. The insertion portion 73 has a convex portion 73a and a base portion 73b. A pair of grooves 71 are formed on both sides of the lower portion of the submount substrate 70, thereby forming the convex portion 73a and the base portion 73b.

Each of the grooves 71 has a vertical wall surface 71a for positioning an X direction of the optical axis 15b of the surface light-emitting device 15, a horizontal wall surface 71b for positioning a Y direction of the optical axis 15b, and a bottom surface 71c for positioning a Z direction (optical axis direction) of the light emitting surface 15a. The vertical wall surface 71a, the horizontal wall surface 71b, and the bottom surface 71c form the step surface.

An n-side electrode 72A is formed on the submount substrate 70 so as to extend from a region of the surface 70a in which the surface light-emitting device 15 is mounted, over one groove 71. A p-side electrode 72B is formed on the submount substrate 70 so as to extend from a region adjacent to the region of the surface 70a in which the surface light-emitting device 15 is mounted, over the other groove 71.

The n-side electrode 72A and the p-side electrode 72B are made of a conductive material such as gold, copper, or the like.

(Assembling Method of Optical Transmission Device)

Figure 10A:
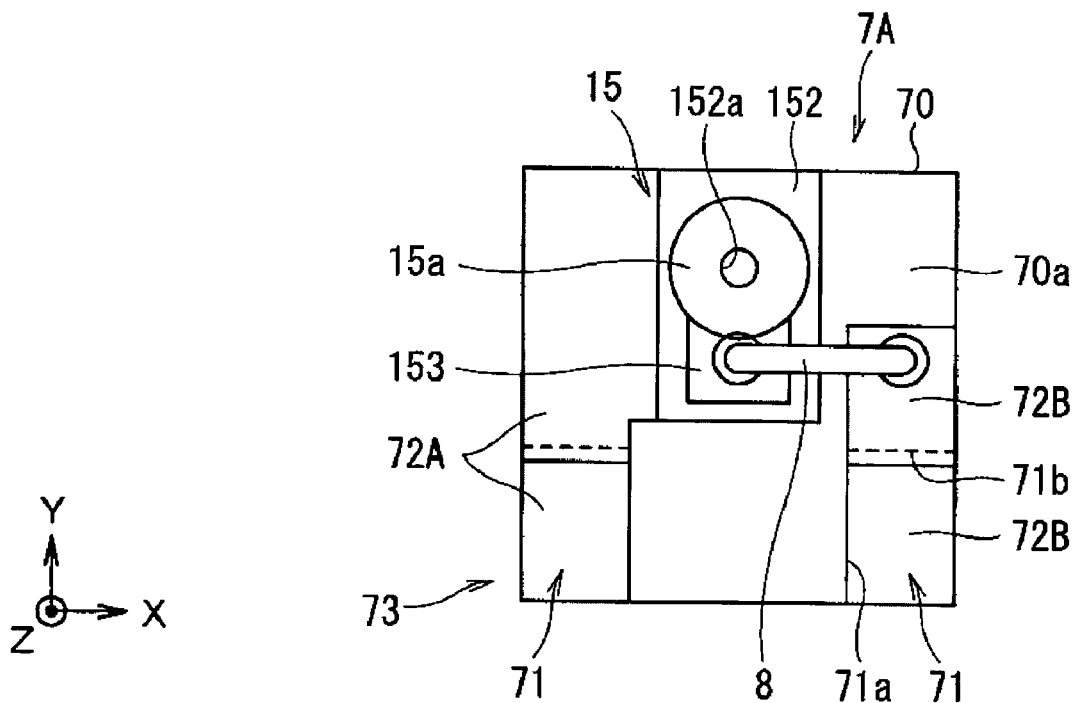
FIGS. 10A and 10B show a state where the surface light-emitting device shown in FIGS. 8A and 8B is mounted on the submount shown in FIGS. 9A to 9C.
Figure 10B:
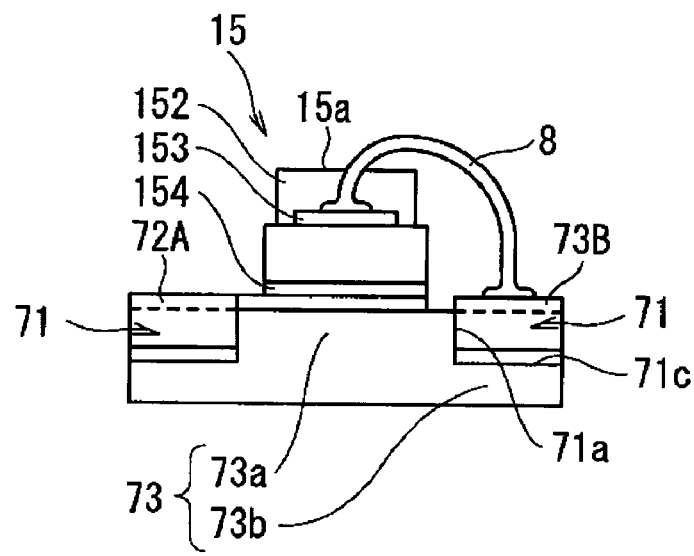
Figure 11:
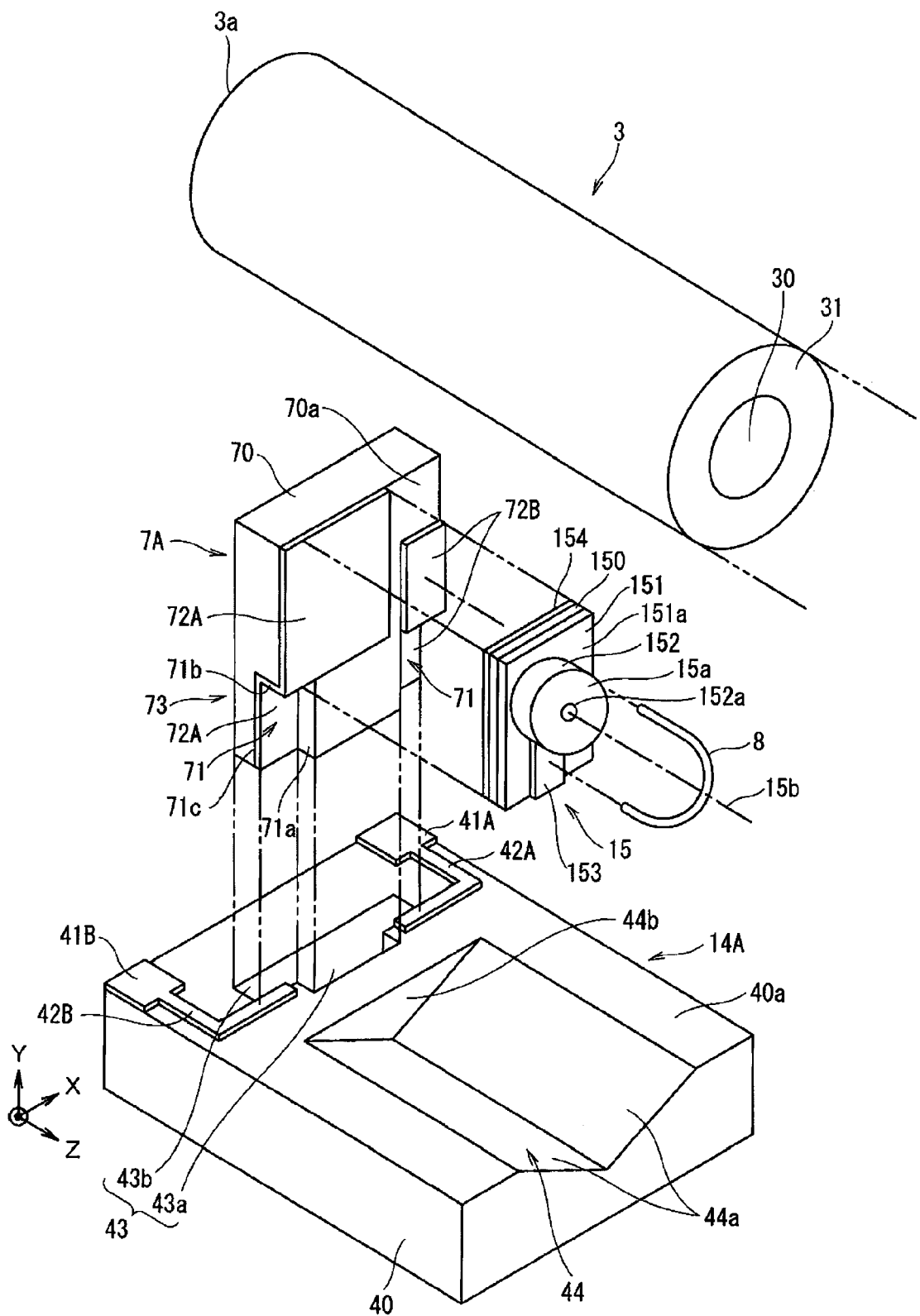
FIG. 11 is a perspective view showing an example of an assembling method of a light emitting module in an optical transmission device according to the second exemplary embodiment.

FIGS. 10A and 10B show a state where the surface light-emitting device 15 shown in FIGS. 8A and 8B is mounted on the submount 7A shown in FIGS. 9A to 9C. FIG. 10A is a front view, and FIG. 10B is a bottom view. FIG. 11 is a perspective view showing the example of the assembling method of the optical transmission device on the light emitting module 2A side. An example of an assembling method of the optical transmission device 1 will be described with reference to FIGS. 10A, 10B, and 11.

At first, the support substrates 14A and 14B, the submounts 7A and 7B, the surface light-emitting device 15, the surface light-receiving device 16, and the optical fiber 3, which is cut by a necessary length, are prepared.

Next, as shown in FIGS. 10A, 10B, and 11, the surface light-emitting device 15 is mounted on the submount 7A. That is, the n-side electrode 154 of the surface light-emitting device 15 is adhered to the n-side electrode 72A of the submount 7A by a conductive adhesive while being observed by a camera or the like such that the optical axis 15b of the surface light-emitting device 15 is disposed at a target position based on the vertical wall surfaces 71a and the horizontal wall surfaces 71b of the grooves 71 of the submount 7A. The lead electrode 153 of the surface light-emitting device 15 and the p-side electrode 72B of the submount 7A are connected to each other by a bonding wire B.

Next, as shown in FIG. 11, the insertion portion 73 of the submount 7A is inserted into the dent 43 of the support substrate 14A. Accordingly, the n-side electrode 72A of the submount 7A comes into contact with the lead wire 42B, and the p-side electrode 72B comes into contact with the lead wire 42A. The n-side electrode 72A and the lead wire 42B, and the p-side electrode 72B and the lead wire 42A are slightly pressed and crushed, and put in a conduction state. In this case, the n-side electrode 72A and the lead wire 42B, and the p-side electrode 72B and the lead wire 42A may be bonded to each other by using a conductive adhesive.

Similarly to the surface light-emitting device 15, with regard to the surface light-receiving device 16, the surface light-receiving device 16 is mounted on the submount 7B, and subsequently, the insertion portion of the submount 7B is inserted into the dent of the support substrate 14B. Accordingly, the lead electrode of the surface light-receiving device 16 and the lead wire 42B are put in a conduction state through the submount 7B, and the n-side electrode of the surface light-receiving device 16 and the lead wire 42A are put in a conduction state through the submount 7B.

Next, the optical fiber 3 is disposed on the V-shaped grooves 44 of the support substrates 4A and 4B, and the optical fiber 3 is fixed to the support substrates 4A and 4B by an adhesive. Subsequently, the electrode pads 41A and 41B of the support substrates 4A and 4B are individually connected to pads on the wiring board by bonding wires, and the optical transmission device is mounted on the wiring board.

Grooves may be formed in the submounts or in the surface light-emitting device and the surface light-receiving device, and the surface light-emitting device and the surface light-receiving device may be mechanically positioned with respect to the submounts.

(Modification 1)

Figure 12A:
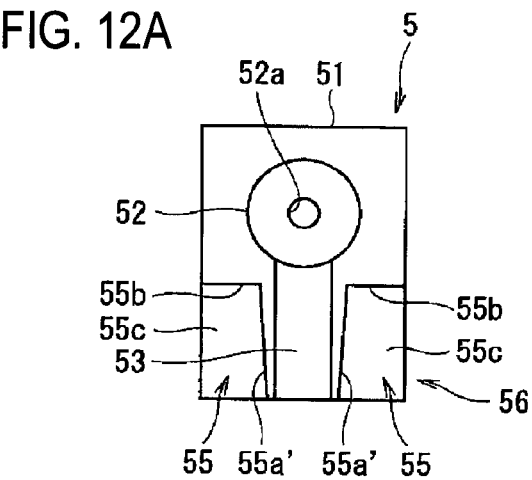
FIGS. 12A to 12G are front views showing Modification 1 of the surface light-emitting device of the first exemplary embodiment.
Figure 12B:
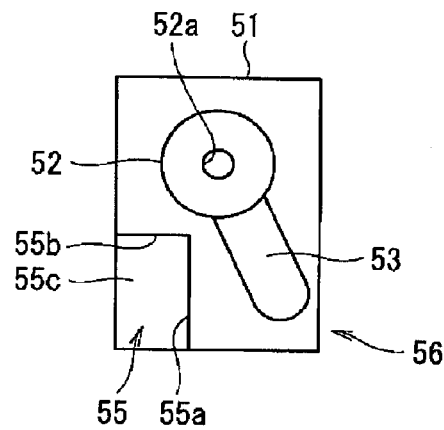
Figure 12C:
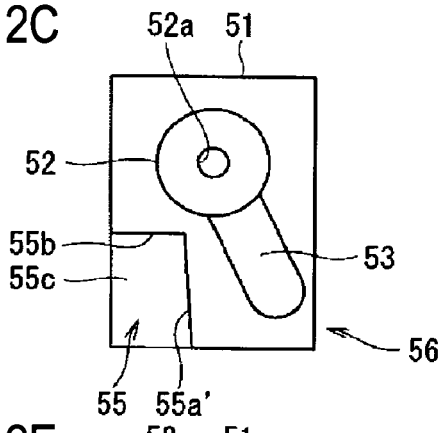
Figure 12D:
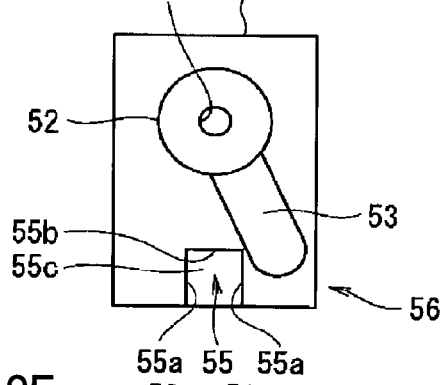
Figure 12E:
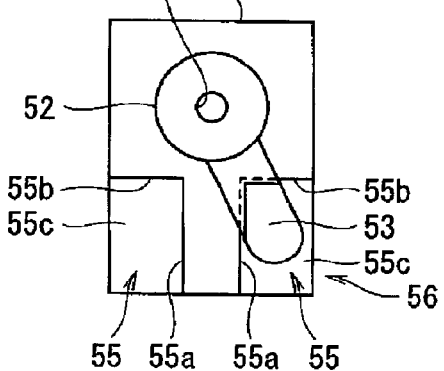
Figure 12F:
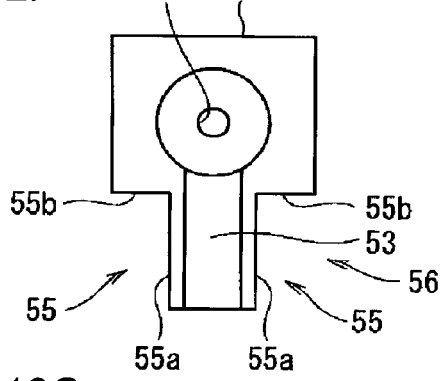
Figure 12G:
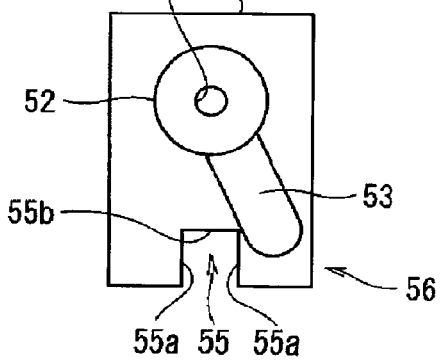

FIGS. 12A to 12G are front views showing Modification 1 of the surface light-emitting device of the first exemplary embodiment. As shown in FIG. 12A, vertical walls 55a' of grooves 55 may be inclined. As shown in FIG. 12B, a lead electrode 53 may be inclined, and a single groove 55 may be formed. As shown in FIG. 12C, a single groove 55 may be provided, and a vertical wall 55a' of the groove 55 may be inclined. As shown in FIG. 12D, a single groove 55 may be provided at the center. As shown in FIG. 12E, a lead electrode 53 may enter a groove 55. As shown in FIGS. 12F and 12G, a groove 55 may be formed to pass through the submount.

(Modification 2)

Figure 13A:
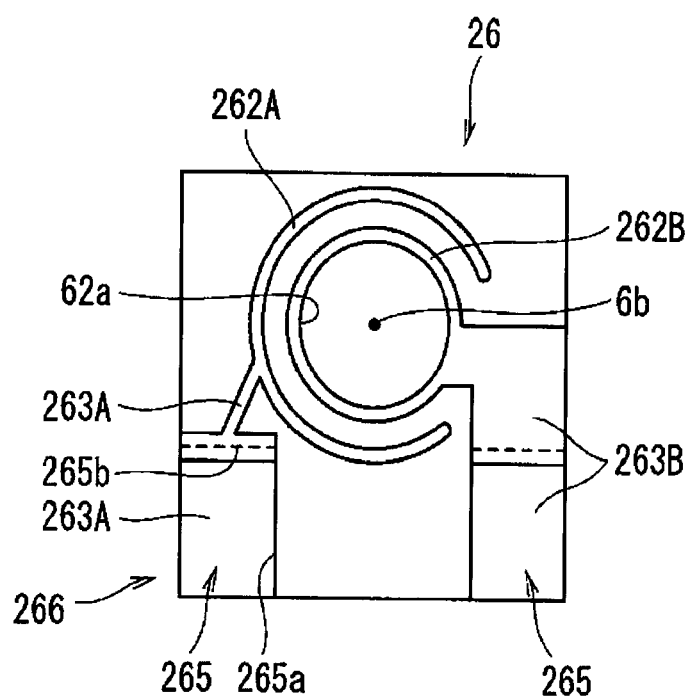
FIGS. 13A and 13B show Modification 2 of the surface light-receiving device of the first exemplary embodiment.
Figure 13B:
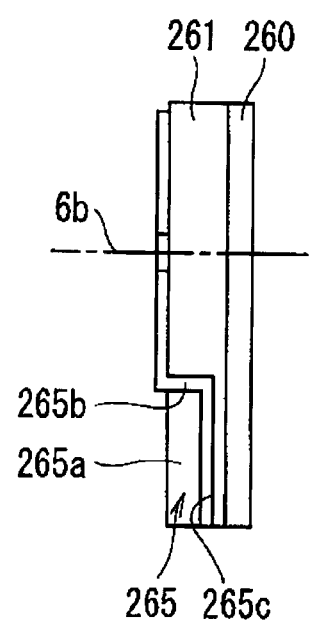

FIGS. 13A and 13B show Modification 2 of the surface light-receiving device of the first exemplary embodiment. FIG. 13A is a front view, and FIG. 13B is a side view. In Modification 2, a p-side electrode and an n-side electrode are disposed on the front surface side.

A surface light-receiving device 26 is a GaAs-based PIN photodiode, and, as shown in FIG. 13A, has an insertion portion 266, which is inserted into the dent of the support substrate, on a lower side. The insertion portion 266 has a convex portion 266a and a base portion 266b. In FIG. 13A, reference numeral 6b denotes an optical axis, and reference numeral 62a denotes an opening.

The surface light-receiving device 26 includes a compound semiconductor laminate structure 261 that is formed on an n-type GaAs substrate 260, and has a P layer, an I layer, and an N layer, which are PIN coupled to each other, and an insertion portion 266 on a lower side of the surface of the compound semiconductor laminate structure 261. A pair of grooves 265 for positioning the surface light-receiving device 26 with respect to the support substrate 4B are formed, a p-side electrode 262A is formed so as to be connected to the P layer, and a lead electrode 263A is formed so as to extend from the p-side electrode 262A over one groove 265. An n-side electrode 262B is formed so as to be connected to the N layer, and a lead electrode 263B is formed so as to extend from the n-side electrode 262B over the other groove 265.

Each of the grooves 265 has a vertical wall surface 265a, a horizontal wall surface 265b, and a bottom surface 265c.

A support substrate for a surface light-receiving device shown in FIGS. 13A and 13B may be used in which lead wires 42A and 42B are disposed so as to come into contact with the lead electrodes 263A and 263B and are put in a conduction with when the insertion portion 266 of the surface light-receiving device 26 is inserted into the dent of the support substrate.

In this exemplary embodiment, the surface light-receiving device will be described, but a surface light-emitting device which has p and n-type electrodes on a surface thereof can be realized in the same manner.

Other Exemplary Embodiments

The invention is not limited to the foregoing exemplary embodiments, but various modifications may be made without departing from the scope of the invention. The constituent elements of the respective exemplary embodiment may be arbitrarily combined without departing from the scope of the invention.

In the foregoing exemplary embodiments, the case in which unidirectional communication from the light emitting module to the light receiving module is performed has been described. Alternatively, a surface light-emitting device and a surface light-receiving device may be disposed on both optical modules, thereby performing bidirectional communication.

Plural surface light-emitting devices may be used in the light emitting module, and plural of surface light-receiving devices may be used in the light receiving module.

What is claimed is:

1. An optical module comprising:
    a mounted member that includes an inserted portion;
    a surface optical device that includes
        a substrate,
        an optical axis provided in a direction perpendicular to the substrate, and
        an insertion portion having a step surface that is inserted into the inserted portion of the mounted member in a direction perpendicular to the optical axis so as to position the optical axis; and
    a positioning portion that is provided in the mounted member, the positioning portion having a pair of inclined surfaces and a vertical surface, the inclined surfaces positioning X and Y directions of an optical axis of an optical transmission member and the vertical surface positioning a Z direction (optical axis direction) of the optical axis of the optical transmission member so that the optical transmission member is optically coupled to the surface optical device and a gap exists between the optical transmission member and an optical surface of the surface optical device;
    the insertion portion having a convex portion and a base portion, the insertion portion further having a bottom surface that positions a Z direction (optical axis direction) of the optical axis of the surface optical device, a vertical wall surface that positions an X direction of the optical axis of the surface optical device, and a horizontal wall surface that positions that Y direction of the optical axis of the surface optical device;
    the inserted portion being a dent, the dent having a first dent portion into which the convex portion of the insertion portion is inserted, and a second dent portion into which the base portion of the insertion portion is inserted.

2. The optical module according to claim 1, wherein
    the inserted portion of the mounted member includes, on a surface thereof, a first electrode that is electrically connected to the surface optical device,
    the insertion portion includes, on a surface thereof, a second electrode that is electrically connected to the first electrode,
    the first and second electrodes are electrically connected to each other by inserting the insertion portion into the inserted portion.

3. The optical module according to claim 1, wherein the surface optical device includes one of a surface light-emitting device and a surface light-receiving device.

4. An optical module comprising:
    a mounted member that includes an inserted portion;
    a surface optical device that includes
        a substrate, and
        an optical axis in a direction perpendicular to the substrate;
    an intermediate member that attaches the surface optical device to the mounted member, and includes an insertion portion having a step surface that is inserted into the inserted portion of the mounted member in a direction perpendicular to the optical axis of the surface optical device so as to position the optical axis of the surface optical device; and
    a positioning portion that is provided in the mounted member, the positioning portion having a pair of inclined surfaces and a vertical surface, the inclined surfaces positioning X and Y directions of an optical axis of an optical transmission member and the vertical surface positioning a Z direction (optical axis direction) of the optical axis of the optical transmission member so that the optical transmission member is optically coupled to the surface optical device and a gap exists between the optical transmission member and an optical surface of the surface optical device;
    the insertion portion having a convex portion and a base portion, the insertion portion further having a bottom surface that positions a Z direction (optical axis direction) of the optical axis of the surface optical device, a vertical wall surface that positions an X direction of the optical axis of the surface optical device, and a horizontal wall surface that positions that Y direction of the optical axis of the surface optical device;
    the inserted portion being a dent, the dent having a first dent portion into which the convex portion of the insertion portion is inserted, and a second dent portion into which the base portion of the insertion portion is inserted.

5. The optical module according to claim 4, wherein the surface optical device includes one of a surface light-emitting device and a surface light-receiving device.

6. An optical transmission device comprising:
    first and second mounted members, each including an inserted portion;
    a surface light-emitting device that includes
        a first substrate,
        a first optical axis provided in a direction perpendicular to the first substrate, and
        a first insertion portion having a first step surface that is inserted into the inserted portion of the first mounted member in a direction perpendicular to the first optical axis so as to position the first optical axis;
        the first insertion portion having a convex portion and a base portion, the first insertion portion further having a bottom surface that positions a Z direction (optical axis direction) of the first optical axis of the surface light-emitting device, a vertical wall surface that positions an X direction of the first optical axis of the surface light-emitting device, and a horizontal wall surface that positions that Y direction of the first optical axis of the surface light-emitting device;
        the inserted portion of the first mounted member being a dent, the dent having a first dent portion into which the convex portion of the first insertion portion is inserted, and a second dent portion into which the base portion of the first insertion portion is inserted;
    a surface light-receiving device that includes
        a second substrate,
        a second optical axis provided in the direction perpendicular to the second substrate, and a second insertion portion having a second step surface that is inserted into the inserted portion of the second mounted member in a direction perpendicular to the second optical axis so as to position the second optical axis;

the second insertion portion having a convex portion and a base portion, the second insertion portion further having a bottom surface that positions a Z direction (optical axis direction) of the second optical axis of the surface light-receiving device, a vertical wall surface that positions an X direction of the second optical axis of the surface light-receiving device, and a horizontal wall surface that positions that Y direction of the second optical axis of the surface light-receiving device;

the inserted portion of the second mounted member being a dent, the dent having a first dent portion into which the convex portion of the second insertion portion is inserted, and a second dent portion into which the base portion of the second insertion portion is inserted;

an optical transmission member that optically couples the surface light-emitting device and the surface light-receiving device;

a first positioning portion that is provided in the first mounted member, the first positioning portion having a pair of inclined surfaces and a vertical surface, the inclined surfaces positioning X and Y directions of an optical axis of an optical transmission member and the vertical surface positioning a Z direction (optical axis direction) of the optical axis of the optical transmission member on one end of the optical transmission member so that the optical transmission member is optically coupled to the surface light-emitting device and a gap exists between the optical transmission member and an optical surface of the surface light-emitting device; and a second positioning portion that is provided in the second mounted member, the second positioning portion having a pair of inclined surfaces and a vertical surface, the inclined surfaces positioning X and Y directions of an optical axis of the optical transmission member and the vertical surface positioning a Z direction (optical axis direction) of the optical axis of the optical transmission member on the other end of the optical transmission member so that the optical transmission member is optically coupled to the surface light-receiving device and a gap exists between the optical transmission member and an optical surface of the surface light-receiving device.

7. A surface optical device comprising:

a substrate;

an optical axis that is provided in a direction perpendicular to the substrate; and an insertion portion having a step surface configured to be inserted into an inserted portion in a direction perpendicular to the optical axis so as to position the optical axis;

the insertion portion having a convex portion and a base portion, the insertion portion further having a bottom surface that positions a Z direction (optical axis direction) of the optical axis of the surface optical device, a vertical wall surface that positions an X direction of the optical axis of the surface optical device, and a horizontal wall surface that positions that Y direction of the optical axis of the surface optical device;

the inserted portion being a dent, the dent having a first dent portion into which the convex portion of the insertion portion is inserted, and a second dent portion into which the base portion of the insertion portion is inserted.

8. The surface optical device according to claim 7, wherein the step surface of the insertion portion includes the vertical wall surface which is parallel to an insertion direction of the insertion portion and the horizontal wall surface which is perpendicular to the insertion direction.

9. The surface optical device according to claim 7, wherein the insertion portion includes an electrode on a surface thereof.

\* \* \* \* \*